United States Patent [19]

Danielsen et al.

[11] 4,006,307
[45] Feb. 1, 1977

[54] IMPULSE NOISE SUPPRESSION CIRCUIT

[75] Inventors: Daniel Danielsen, Wheaton; Kermit Shoff Dunlap, Naperville; George Haugk, St. Charles; Richard Barton Sanderson, Lisle, all of Ill.

[73] Assignee: Bell Telephone Laboratories, Incorporated, Murray Hill, N.J.

[22] Filed: July 9, 1975

[21] Appl. No.: 594,192

[52] U.S. Cl. .............................. 179/1 P; 179/18 G; 307/244

[51] Int. Cl.² ........................................ H03K 17/00

[58] Field of Search .......... 307/246, 244; 179/18 F, 179/18 FA, 18 G, 18 GE, 18 E, 1 P

[56] References Cited
UNITED STATES PATENTS

| | | | |
|---|---|---|---|
| 3,207,952 | 9/1965 | Brahm | 307/247 X |
| 3,610,953 | 10/1971 | Gordon | 307/244 |
| 3,814,862 | 6/1974 | Eddy | 179/18 GE |
| 3,870,905 | 3/1975 | Chikazawa | 307/254 |
| 3,886,319 | 5/1975 | Walker | 179/18 FA |
| 3,912,941 | 10/1975 | Passarella | 179/18 G |

Primary Examiner—Kathleen H. Claffy
Assistant Examiner—E. S. Kemeny
Attorney, Agent, or Firm—John C. Albrecht

[57] ABSTRACT

A circuit for reducing transmitted and radiated impulse noise which is generated by opening and closing connections between a transmission path and a source of potential. In the case of closing such a connection a path is connected to a substantially zero potential and the potential is increased to the operating potential over a preset period of time. In the case of opening such a connection the connected potential is decreased to substantially zero over a preset period of time and the path is opened. A potential control circuit is connected between the battery side of the transmission path and the source of potential and the control thereof is coordinated with the connecting means to achieve the described sequences.

4 Claims, 3 Drawing Figures

IMPULSE NOISE SUPPRESSION CIRCUIT

FIELD OF THE INVENTION

This invention relates to impulse noise reduction and more particularly to the reduction of impulse noise radiated and transmitted when connections between a transmission path and a source of potential are opened and closed.

BACKGROUND OF THE INVENTION

Impulse noise on telephone lines, which results in clicks in customers' receivers, is generated when switching connections are opened and closed. Varistors connected across the tip and ring conductors in customer telephone sets limit this noise to a level which will not injure the ear. During call set up, such limited click noise is not annoying to the customer because he expects it and it indicates that the switching system is responding to his request. However, where there is a reswitching of connections, as is common in several of the newer switching services, noise of the same level occurs during the talking connection and, since unexpected, is distracting and annoying to the customer.

SUMMARY OF THE INVENTION

In accordance with our invention an impulse noise reduction arrangement comprises switching means for connecting a transmission path to a source of potential through a potential control circuit arrangement which controls the rate of rise and fall of the potential supplied to the transmission path. The path is closed to a substantially zero potential and the potential is increased over a preset period of time to the operating potential required. Likewise the path is opened from a substantially zero potential by initially reducing the potential over a preset period of time.

BRIEF DESCRIPTION OF THE DRAWING

The invention wil be understood from the following detailed description when read with reference to the drawing in which.

DETAILED DESCRIPTION

Our invention reduces click noise in any connection of a telephone transmission path to a direct current source of potential or in any disconnection of a telephone transmission path from a direct current source of potential and is particularly beneficial in telephone call waiting service. A telephone line arranged for call waiting service is able to receive notice of a second call while busy with a first call. Upon the occurrence of a call to a busy line which is arranged for call waiting service (termed a call waiting line, herein), a momentary tone signal is provided to the call waiting line and the call waiting line may receive the waiting call or not at its option. The call waiting customer momentarily depresses (flashes) his switchhook if he wants to receive the waiting call, otherwise he does nothing.

Figure 1:
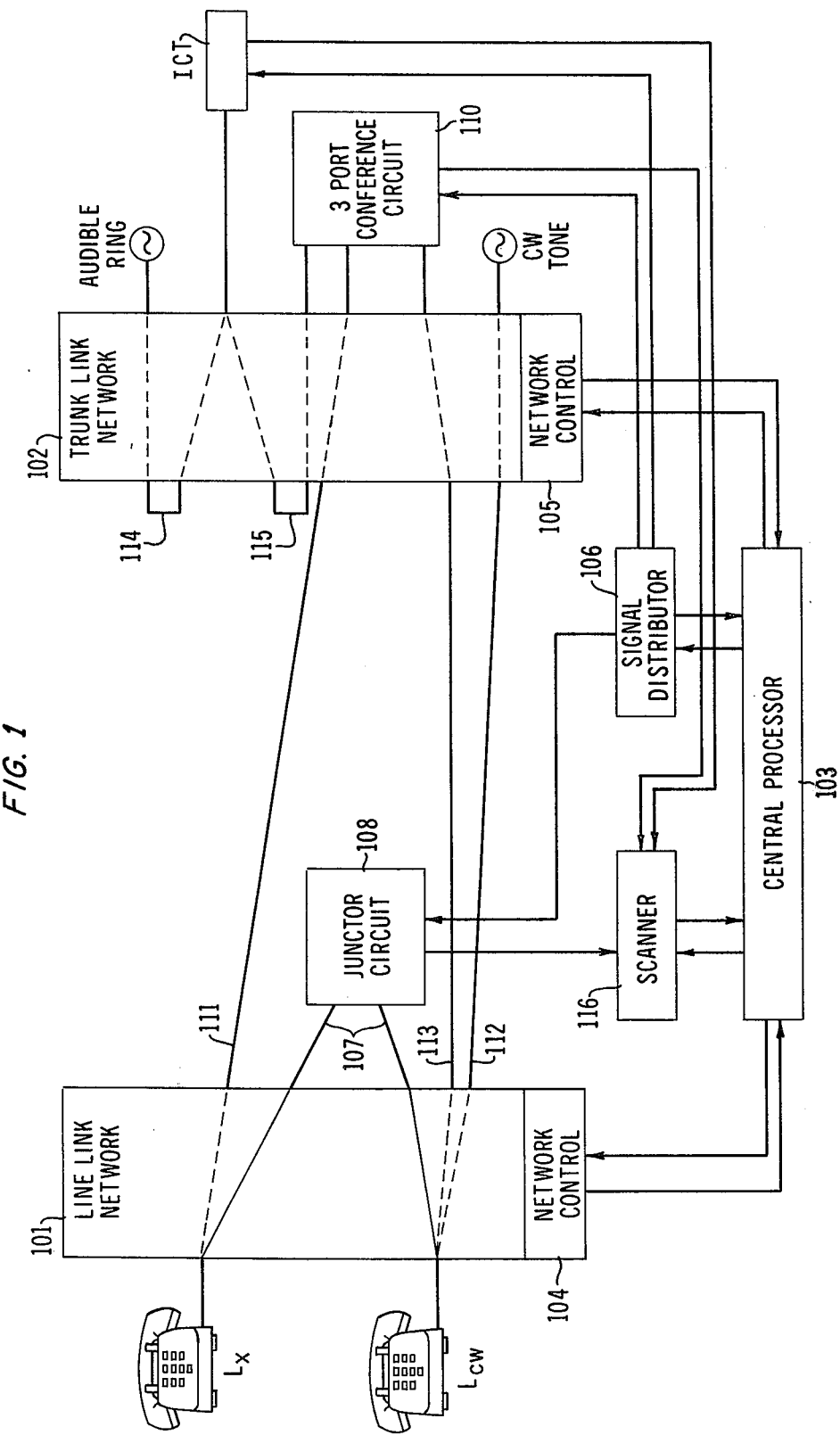
FIG. 1 is a block diagram of a telephone switching system showing operation for call waiting service.

The block diagram of FIG. 1 shows an illustrative telephone switching system which is arranged to provide call waiting service. Customer lines and junctors (both wire junctors and junctor circuits) are terminated on the line link network 101 while trunks, wire junctors, and service circuits are terminated on the trunk line network 102. These switching networks individually or together serve to selectively interconnect through metallic paths lines to lines via junctor circuits, lines to trunks, and lines and trunks to tone circuits and other service circuits. The central processor 103 controls the line link network 101 and the trunk line network 102 via their individual network controllers 104 and 105, respectively, and controls trunks, junctor circuits, and service circuits via the signal distributor 106. The network controllers 104 and 105 and the signal distributor 106 serve to buffer the high speed signals from the central processor 103 and the slower speed network and peripheral circuitry. Information from trunks, junctor circuits, and service circuits is sent to the central processor 103 via the scanner circuit 116.

The network paths shown in FIG. 1 illustrate system operation upon occurrence of an incoming call for a busy line which is arranged for call waiting service, $L_{cw}$. An established path 107 between $L_{cw}$ and a second line $L_x$ includes the junctor circuit 108 which provides talking potential and supervision for both $L_x$ and $L_{cw}$. Upon the occurrence of an incoming call for $L_{cw}$, over the incoming trunk ICT, the central processor 103 determines that $L_{cw}$ is busy and is arranged for call waiting service. Next the central processor reserves an idle three-port conference circuit 110. The three-port conference circuit 110 presents three electrically identical ports to the trunk link network each of which provides talking potential and supervisory elements for the line attached thereto. $L_{cw}$ may be connected to any one of the three ports but once connected, that port becomes the control port and flashes received on that port control the call waiting service. State relays in the three-port conference circuit 110 are operated and released by the central processor 103 via the signal distributor 106 to interconnect the control port to a second port while isolating the remaining port. The central processor 103 reserves the paths indicated by dashed lines in FIG. 1 and the call waiting procedure progresses as follows. The central processor 103 via the signal distributor 106 controls the junctor circuit 108 to open the paths to both $L_x$ and $L_{cw}$ so that the network can be reconfigured. $L_{cw}$ is then momentarily connected to a call waiting tone circuit via path 112 to signal the call waiting line that a call is waiting. After the momentary tone signal, $L_{cw}$ is connected to one port of the three-port conference circuit 110 (which becomes the control port) via path 113. Concurrently $L_x$ is connected to a second port of the three-port conference circuit via path 111. The talking path between $L_x$ and $L_{cw}$ is then reestablished through the three-port conference circuit 110. At this time the incoming call on ICT is connected to an audible ring circuit via path 114. If $L_{cw}$ fails to flash his switchhook within a predetermined period of time, $L_{cw}$ will be momentarily reconnected to the call waiting tone circuit via path 112 for a second call waiting signal and then returned to the control port via path 113. If $L_{cw}$ flashes his switchhook to accept the incoming call, the three-port conference circuit 110 will detect the flash, the central processor 103 will be informed via the scanner circuit 116 and will reconfigure the three-port conference circuit 110 to interconnect $L_{cw}$ to ICT via paths 115 and 113. If $L_{cw}$ elects to ignore the waiting call on ICT he does not flash his switchhook. If the incoming call abandons the original call will be reconfigured through path 107 which includes the junctor circuit 108 or an equivalent path to release the three-port conference circuit 110 so that it may be used on other calls.

During this sequence, whenever a connection between a line and a direct current source of potential is opened or closed, impulse noise is generated and transmitted to the customer resulting in a click in his ear. Our invention reduces the impulse noise to a level which significantly reduces customer annoyance by eliminating the abrupt voltage changes when lines are connected to or disconnected from a direct current source of potential. The abrupt potential changes are eliminated by potential control circuits which provide an increase of potential over a preset period of time from substantially zero to the operating potential (referred to as an up ramp, herein) for connection and a decrease of potential over a preset period of time from the operating potential to substantially zero potential (referred to as a down ramp, herein) for disconnection.

For click reduction during all phases of a customer's call, potential control circuits must be utilized in all circuits which provide a direct current source of potential to a customer's line or trunk conductors. However, it is recognized that click noise is not annoying during certain phases of a call, therefore, potential control circuits may be selectively provided. For example, it is not necessary to provide potential control circuits in the receiver circuits utilized during initial call setup where click noise is expected and hence not annoying.

Where call waiting service is provided in the manner shown in FIG. 1, potential control circuits are required in all junctor circuits, all trunk circuits, and all three-port conference circuits. Operation of the potential control circuit and the sequencing within individual trunk, junctor, and service circuits does not vary from circuit to circuit, accordingly, only a junctor circuit incorporating our invention will be described.

Figure 2:
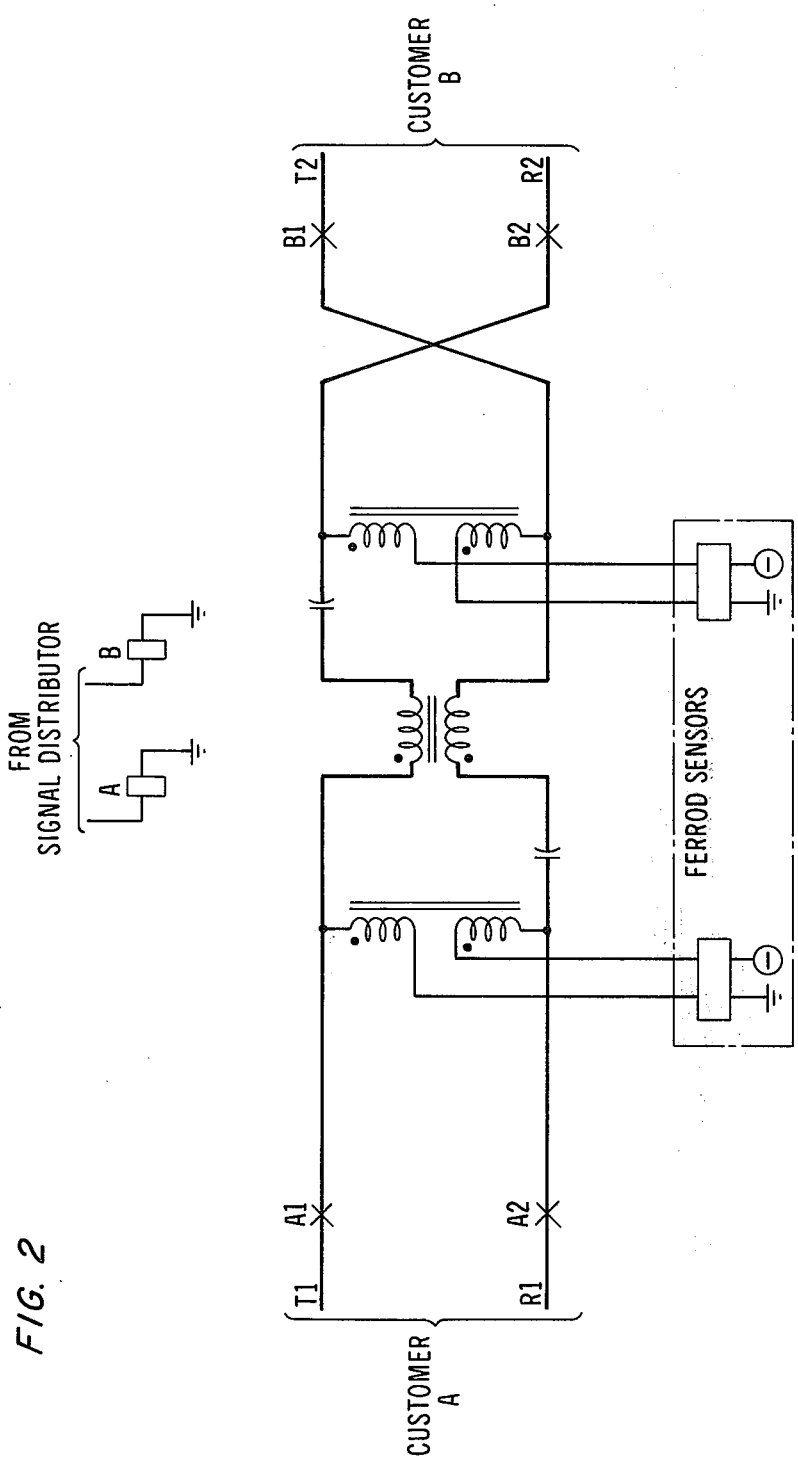
FIG. 2 is a schematic diagram of a telephone junctor circuit as utilized in presently existing telephone switching systems.

FIG. 2 shows an illustrative telephone junctor circuit utilized in existing telephone switching systems. The junctor circuit provides an alternating current talking path between two network paths through the line link network to interconnect two customers served by the same switching system. The junctor circuit provides talking potential and supervisory elements to the two connected customer's lines. The A relay which is controlled by the central processor 103 via the signal distributor 106 serves to connect the A customer line to the direct current source of potential via contacts A1 and A2. The B relay serves the same purpose for the B customer line. When the A and B relays are operated or released, the change in potential applied to the lines is abrupt and results in impulse noise.

Figure 3:
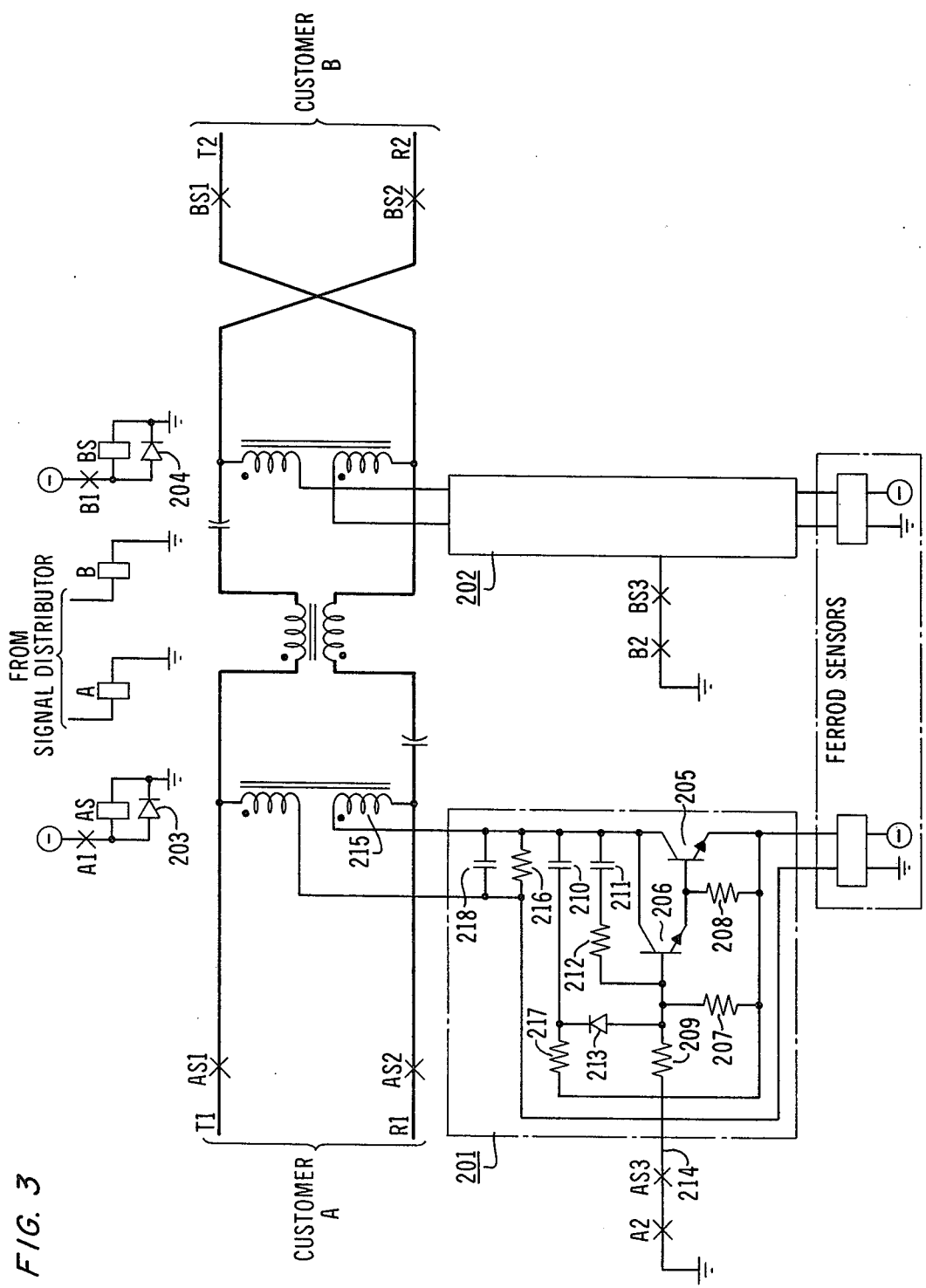
FIG. 3 is a schematic diagram of a telephone junctor circuit which incorporates our impulse noise reduction arrangement.

The telephone junctor circuit of FIG. 2 has been modified in FIG. 3 by the addition of potential control circuits 201 and 202 and relays AS and BS whose release times are slowed by shunting their control coils with the diodes 203 and 204, respectively. The AS relay is slave operated by normally open contact A1 of the A relay and the BS relay is similarly slaved to the B relay. The A and B relay contacts used to connect the customer's lines to the source of potential have been replaced by contacts of the AS and BS relays, respectively. Further, a series connection of contact A2 of the A relay and contact AS3 of the AS relay is utilized to control the potential control circuit 201. The potential control circuit 202 is similarly controlled by a series connection of contact B2 of the B relay and contact BS3 of the BS relay.

Only the potential control circuit 201 will be described since the potential control circuits 201 and 202 are identical. The potential control circuit 201 comprises the transistors 205 and 206 which are connected as a Darlington pair. The resistors 207 and 208 reduce the base drive to the transistors 205 and 206, thereby gain limiting the Darlington pair to compensate for variations between devices. The resistor 209 limits the input current to the transistor 206.

The capacitors 210 and 211 together with the resistor 212 and the diode 213 provide feedback to control the up-ramp and down-ramp times. The resistor 212 limits the feedback through the capacitor 211 to stabilize the circuit. Ground is connected to the control lead 214 to activate the circuit by providing base drive to the transistor 206 to up-ramp the potential supplied to the A customer's line. The diode 213 is forward biased during this up-ramp time, accordingly, the parallel combination of the capacitors 210 and 211 provide feedback. Thus, the resistor 209 and the parallel combination of the capacitors 210 and 211 set the up-ramp time. Ground is removed from the control lead 214 by opening the contact A2 to deactivate the potential control circuit by removing base drive from the transistor 206 to down-ramp the potential supplied to the A customer's line. The diode 213 is reverse biased during the down-ramp time, accordingly, only the capacitor 211 provides feedback. Reduced feedback is required for the down-ramp due to the energy stored in the inductor 215 which would otherwise extend the down-ramp time.

After the junctor circuit is removed from a talking connection, a charge remains on the capacitors 210 and 211. This charge must be reversed before the circuit is reused or it will result in an abrupt change in the voltage applied to the A customer's line and generate impulse noise. A reverse charge is restored to the capacitor 211 through the resistors 207, 212, and 216; and to the capacitor 210 through the resistors 216 and 217. The resistor 217 is required to bypass the diode 213 for restoring the charge to the capacitor 210.

The capacitor 218 smooths the ramp waveform discontinuities and sinks current from the inductor 215 during down-ramp.

Proper sequencing of the up and down ramps and the connections through the junctor circuit is accomplished by the A and AS relays for the A customer's line and by the B and BS relays for the B customer's line. Only circuit sequencing for the A customer's line will be described since the sequencing is the same for both the A and B customer's lines.

In FIG. 1 the path 107 between $L_x$ and $L_{cw}$, including the junctor circuit 108, is established when the connections in the junctor circuit 108 are completed. The central processor 103 closes the connection for the A customer's line (which can be either $L_x$ or $L_{cw}$) by operating the A relay in the junctor circuit 108 via the signal distributor 106. When the A relay of the junctor circuit of FIG. 2 is operated, impulse noise is generated. Such impulse noise is significantly reduced by the junctor circuit of FIG. 3 by initially closing the connection to a substantially zero potential presented by the potential control circuit 201 and then up-ramping the potential to the operating potential. Operation of the A relay of the junctor circuit of FIG. 3 closes the operate path of the slave relay AS via contact A1 and connects ground through to the contact AS3 of the AS relay in the control path of the potential control circuit 201 via contact A2.

Upon operation of the AS relay, the connections to the A customer's line are completed by contacts AS1 and AS2 and contact AS3 closes to connect ground to the control lead 214 of the potential control circuit 201. As previously described, connection of ground to the control lead 214 of the potential control circuit 201 activates the circuit to up-ramp the potential supplied to the A customer's line to the operating potential. The potential control circuit continues to provide operating potential to the A customer's line until $L_r$ or $L_{cw}$ terminates the connection or until a network reconfiguration is required.

An example of when a network reconfiguration is required is call waiting service. Upon the arrival of an incoming call to the call waiting line $L_{cw}$, the connection of the A customer's line must be opened to allow the line link network 101 and the trunk link network 102 to be reconfigured. The central processor 103 opens the connection for the A customer's line (which can be either $L_r$ or $L_{cw}$) by releasing the A relay in the junctor circuit 108 via the signal distributor 106. When the A relay of the junctor circuit of FIG. 2 is released, impulse noise is generated. Such impulse noise is significantly reduced by the junctor circuit of FIG. 3 by initially down-ramping the potential presented to the line by potential control circuit 201 to substantially zero potential before the connection is opened. Release of the A relay of the junctor circuit of FIG. 3 opens the hold path of the slave relay AS via contact A1 and removes ground from the control lead 214 of the potential control circuit 201. As previously described, removal of ground from the control lead 214 of the potential control circuit 201 deactivates the circuit to down-ramp the potential supplied to the A customer's line to substantially zero. The down-ramp time is predetermined to be less than the release time of the AS relay. Thus, the potential provided to the A customer's line is reduced to substantially zero potential before the As relay releases and opens the A customer's connection in the junctor circuit via the AS1 and AS2 contacts. Release of the AS relay also opens the path between the A2 contact and the control lead 214 to prepare the junctor circuit for reuse.

It should be noted that operation and sequencing for the B customer's side of the junctor circuit is identical to that of the A customer's side.

To reduce all impulse noise encountered on a call, all connections of a customer's line to a source of potential would require potential control circuits and proper sequencing as described for the junctor circuit. However, impulse noise when expected is not annoying, therefore, the circuitry could be eliminated in some circuits; for example, the potential control circuitry can be eliminated from the customer dial pulse receiving circuits.

What is claimed is:

1. A transmission circuit for a communication switching system comprising:
at least one port comprising first and second terminals;
a source of direct current power comprising a ground terminal and a battery terminal;
first and second conducting paths for interconnecting said ground and battery terminals to said first and second terminals respectively, each of said conducting paths comprising switching means and an inductor in series therewith, and said conducting path for connecting said battery terminal to said second terminal further comprises potential control means for selectively ramping the rise and fall of the potential connected to said second terminal; and further switching means coordinated with said switching means in said first and second conducting paths for controlling said potential control means.

2. A transmissiom circuit in accordance with claim 1 wherein said potential control means comprises:
semiconductor switching means; and
a first feedback path for regulating said potential ramp-rise and a second feedback path for regulating said potential ramp-fall.

3. A transmission circuit in accordance with claim 1 wherein said potential control means comprises:
semiconductor switching means; and
a first feedback path and a second feedback path connected in parallel with one and another, said first and second feedback paths in combination defining said ramp-rise and said second path defining said ramp-fall.

4. A transmission circuit in accordance with claim 1 wherein said potential control circuit comprises:
first and second transistors of one type having base, collector and emitter terminals, said collector terminals of said transistors being interconnected and connected to said inductor;
said base terminal of said second transistor connected to said emitter of said first transistor;
said emitter terminal of said second transistor connected to said battery terminal;
feedback means connecting said collector terminals and said base terminal of said first transistor for providing different feedback control for ramp-rise and ramp-fall, said feedback means comprising a first series combination of a first resistor and a first capacitor in parallel with a second series combination of a diode and a second capacitor wherein said diode is poled opposite to the base emitter junction of said first transistor;
a second resistor coupling said battery terminal to said base terminal of said first transistor;
a third resistor coupling said battery terminal to said base terminal of said second transistor;
a fourth resistor coupling said battery terminal to the junction of said diode and said second capacitor;
a fifth resistor and a third capacitor in parallel coupling said ground terminal to said collector terminals of said transistors; and
a sixth resistor connected between said base terminal of said first transistor and said further switching means for limiting the current flow to said base terminal of said first transistor.

* * * * *

UNITED STATES PATENT AND TRADEMARK OFFICE
CERTIFICATE OF CORRECTION

PATENT NO. : 4,006,307

DATED : February 1, 1977

INVENTOR(S) : Daniel Danielsen, Kermit S. Dunlap, George Haugk and Richard B. Sanderson It is certified that error appears in the above-identified patent and that said Letters Patent are hereby corrected as shown below:

In column 2, line 7, "line" should read --link--; line 12, "line", second occurrence, should read --link--. In column 6, line 39, after "emitter" and before "of" --terminal-- should be inserted.

Signed and Sealed this fifth Day of July 1977

[SEAL]

Attest:

RUTH C. MASON
Attesting Officer

C. MARSHALL DANN
Commissioner of Patents and Trademarks